United States Patent [19]

Pizzo

[11] Patent Number: 4,962,972
[45] Date of Patent: Oct. 16, 1990

[54] CYCLING AUTOMATIC WHEEL LOCKUP CONTROL APPARATUS

[76] Inventor: Joseph Pizzo, 12635 Main St., Apt. 217, Garden Grove, Calif. 92640

[21] Appl. No.: 261,497

[22] Filed: Oct. 24, 1988

[51] Int. Cl.$^5$ .............................................. B60T 8/02
[52] U.S. Cl. ....................................... 303/116; 303/10; 303/61; 303/DIG. 4
[58] Field of Search ............... 303/116, 114, 113, 115, 303/DIG. 3, DIG. 4, 61, 117, 10

[56] References Cited

U.S. PATENT DOCUMENTS

| | | | |
|---|---|---|---|
| 3,948,568 | 4/1976 | Leiber | 303/DIG. 4 |
| 4,033,637 | 7/1977 | Leiber | 303/115 |
| 4,109,970 | 8/1978 | Ashby, Jr. | 303/61 |
| 4,428,620 | 1/1984 | Warwick et al. | 303/DIG. 3 |
| 4,453,782 | 6/1984 | Arikawa et al. | 303/116 X |
| 4,568,131 | 2/1986 | Blomberg et al. | 303/116 X |
| 4,715,665 | 12/1987 | Ostwald | 303/116 |
| 4,730,879 | 3/1988 | Adachi et al. | 303/116 |
| 4,755,007 | 7/1988 | Mollat | 303/61 |

FOREIGN PATENT DOCUMENTS

2057613  4/1981  United Kingdom ................ 303/116

*Primary Examiner*—Robert P. Olszewski
*Assistant Examiner*—Matthew C. Graham
*Attorney, Agent, or Firm*—William L. Chapin

[57] ABSTRACT

An automatic wheel lock-up control apparatus alternately and cyclically applies brake-pedal controlled pressure to the primary and secondary brake lines driving the slave cylinders of a vehicle's wheel brakes when the brake-pedal pressure exceeds a predetermined value. The apparatus includes an elongated cylindrical body having identical halves, one containing a primary valve for removing or applying primary master cylinder pressure to the primary brakes, and the other containing an identical secondary valve for removing or applying secondary master cylinder pressure to the secondary brakes. An eccentric rotated by an electric motor reciprocally drives a pushrod longitudinally within the body of the apparatus to operate the primary and secondary valves in an alternate, push-pull fashion. The motor is energized by a battery connected in series with a separate pressure switch on the inlet sides of both primary and secondary valves, initiating operation of the apparatus when the pressure in either master cylinder inlet exceeds a predetermined threshold.

18 Claims, 5 Drawing Sheets

CYCLING AUTOMATIC WHEEL LOCKUP CONTROL APPARATUS

BACKGROUND OF THE INVENTION

1. Field of the Invention

This invention relates to hydraulic wheel brake systems used on motor vehicles such as automobiles, trucks, motorcycles, buses and aircraft. More particularly, the invention relates to methods and apparatus for reducing the duration of lockup of a vehicle's wheels during hard braking or braking on slippery surfaces, thereby reducing the tendency of the vehicle to go into an uncontrolled skid and increasing the effectiveness of the vehicle's braking system.

2. Description of Background Art

All conventional motor vehicles, including automobiles, trucks, motorcycles, buses and aircraft have brakes attached to wheels of the vehicle to permit the vehicle to be slowed or stopped as required. With the exception of the air brake systems used by some buses and trucks, most motor vehicles employ hydraulic brakes.

Whichever braking system is used, all motor vehicles having multi-wheel braking systems are likely to sometimes encounter conditions in which one or more of the wheels to which a braking force is applied "lockup," i.e., cease to rotate. Such wheel lockups can cause the vehicle to skid in an uncontrolled fashion.

Wheel lockup results when braking torque applied to a wheel is sufficient to cause the surface of the wheel in contact with the roadway to exert a tangential frictional force exceeding the breakaway force threshold at which the wheel tends to slide rather than roll on the surface. This breakaway force depends on a number of factors, but is dependent primarily on the coefficient of sliding friction between the wheel and the roadway. Thus, when a vehicle is on a wet or icy roadway, the coefficient of sliding friction between the circumferential surface of the wheel and the roadway may be quite low. Under these conditions, the wheels of the vehicle will lockup even with the application of relatively modest braking forces.

Wheel lockup lasting for an uncontrolled duration is undesirable, since it can cause a vehicle to move in directions not controllable by the driver. Thus, for example, if one or more wheels on one side of a vehicle lockup while the other wheels continue to rotate, the vehicle path may skid, deviating from the path which the driver desires the vehicle to take. In some skids caused by wheel lockup, the vehicle may spin around 360 degrees or more. Obviously, such uncontrolled skids caused by wheel lockup can be very dangerous if not life threatening, and should be avoided.

Wheel lockup does not always result in an uncontrolled skid, yet is still undesirable. Thus, wheel lockup can reduce braking efficiency and increase stopping distance, for the following reason.

When a wheel is rolling with respect to a road surface, and brakes are applied, reduction of the tangential velocity of the circumferential surface of the tire relative to the linear velocity of the vehicle with respect to the road produces a frictional force between the tires and road which is responsible for slowing the vehicle. The magnitude of this frictional force, and therefore of the rate of vehicle deceleration, is proportional to the coefficient of friction between the tire and road. To maximize the possible braking deceleration, then, the coefficient of friction between tire and roadway should be maximized.

If a tire is rolling with respect to the road, the coefficient of friction which determines maximum braking force is the static coefficient of friction, since the tire surface is not sliding on the roadway. However, when wheel lockup occurs, the tire surface slides with respect to the roadway. The frictional braking force is in this case determined by the kinetic coefficient of friction between the tire and road. Since the kinetic coefficient of friction is smaller than the static coefficient of friction, maximum braking force achievable with wheels locked up is substantially smaller than that obtainable with the wheels rotating. Hence, uncontrolled wheel lockup results in increased stopping times and distances, and should therefore be avoided.

In recent years, a significant amount of research and engineering effort has resulted in the development and installation on motor vehicles of braking systems intended to minimize the occurrence of uncontrolled wheel lockup and accompanying uncontrolled skids and reduction in braking effectiveness. Such systems are often referred to as ABS systems (anti-skid or anti-lock braking systems). Typically, existing ABS are relatively complex and costly. Their complexity and cost stems in part from the fact that most existing ABS systems use individual wheel lockup sensors on each wheel, a computerized control system responsive to input signals produced by the wheel sensors, and valves responsive to command output signals produced by the control system in applying the proper amount of hydraulic pressure to the slave cylinder on each wheel brake to maximize braking force while avoiding wheel lockup. In addition to the cost and complexity of existing ABS systems, they are, for the most part, ill-suited to retrofitting installation on existing motor vehicles.

Prior art references disclosing systems for minimizing wheel lockup include the following U.S. patents:

U.S. Pat. No. 4,109,970, Ashby, Jr., Aug. 29, 1978, Anti-Skid Brake Control System.

U.S. Pat. No. 4,113,323, Haney, Sept. 12, 1978, Anti-Skid Power Valve.

U.S. Pat. No. 4,715,665, Ostwald, Dec. 29, 1987, Brake Slip Controlled Brake For Automotive Vehicles.

The automatic wheel lockup control apparatus according to the present invention was conceived of to provide an alternate lockup control system which may be easily installed during the manufacture of a motor vehicle, or be retrofitted into existing vehicles. Its primary application would be in vehicles having a dual braking system, although installation on a single braking system will convert the latter to a dual system. Most modern vehicles have a dual braking system in which one hydraulic braking circuit drives the front wheel brakes, or diagonally opposed front and rear wheel brakes. The other circuit drives the real wheels, or the other diagonally opposed set of wheels. In such a system, damage to one hydraulic circuit will not disable the other circuit, ensuring the operability of at least the braking system for two of the four wheels.

OBJECTS OF THE INVENTION

An object of the present invention is to provide an apparatus for minimizing the tendency of a vehicle's wheels to lockup for a long duration upon the application of braking force to the wheels.

Another object of the invention is to provide an apparatus that upon application of pedal braking pressure will automatically and rapidly pressure and release one set of brakes while releasing and pressuring the alternate set of brakes.

Another object of the invention is to provide a means of moderating the rate of release of brake pressure so as to minimize the braking pulsation caused by the application and release of braking pressure.

Another object of the invention is to provide an automatic wheel lockup control apparatus which does not require the use of skid sensors or a computer and valving system.

Another object of the invention is to provide an automatic wheel lockup control apparatus which consists of a single component installable in the hydraulic brake circuit of a vehicle.

Another object of the invention is to provide an automatic wheel lockup control apparatus which is readily installable in the hydraulic circuit of a new vehicle during its manufacture, as well as being readily retrofitted to an existing vehicle.

Another object of the invention is to provide an automatic wheel lockup control apparatus useable on a vehicle without requiring any alteration of the vehicle's existing hydraulic brake components, except for some of the hydraulic brake lines.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiment. Accordingly, I do not intend that the scope of my exclusive rights and privileges in the invention be limited to details of the embodiments described. I do intend that equivalents, adaptations and modifications of the invention reasonably inferrable from the description contained herein be included within the scope of the invention as defined by the appended claims.

SUMMARY OF THE INVENTION

Briefly stated, the present invention comprehends an automatic wheel lockup control apparatus which alternately applies brake-pedal controlled hydraulic pressure to the two separate hydraulic brake circuits driving two separate sets of wheel brakes commonly used on most motor vehicles. The apparatus is intended for installation into the hydraulic brake circuit of an existing dual master cylinder braking system, between the two master cylinder outlet ports and the two separate brake line circuits which are connected to the wheel brake cylinders on each of the four wheels of the vehicle.

The apparatus includes pressure sensor means responsive to hydraulic pressure from both of the output pressure lines from a dual master cylinder. When the hydraulic pressure in either of these lines exceeds a predetermined threshold level, the pressure sensor means produces an output signal effective in driving a selector valve means to alternately and cyclically apply braking pressure to the two wheel brake circuits at a relatively high cycling rate. Thus, the apparatus automatically causes braking force to be alternately and cyclically applied to the two sets of wheel brakes, causing only momentary skidding on alternate sets of wheels during hard braking and/or slippery roadway conditions, decreasing the likelihood of panic skids caused by over-pressuring the brakes.

DETAILED DESCRIPTION OF THE INVENTION

Referring now to FIGS. 1 through 11, a cycling automatic wheel lockup control apparatus according to the present invention is shown.

Figures 1, 2, 4:
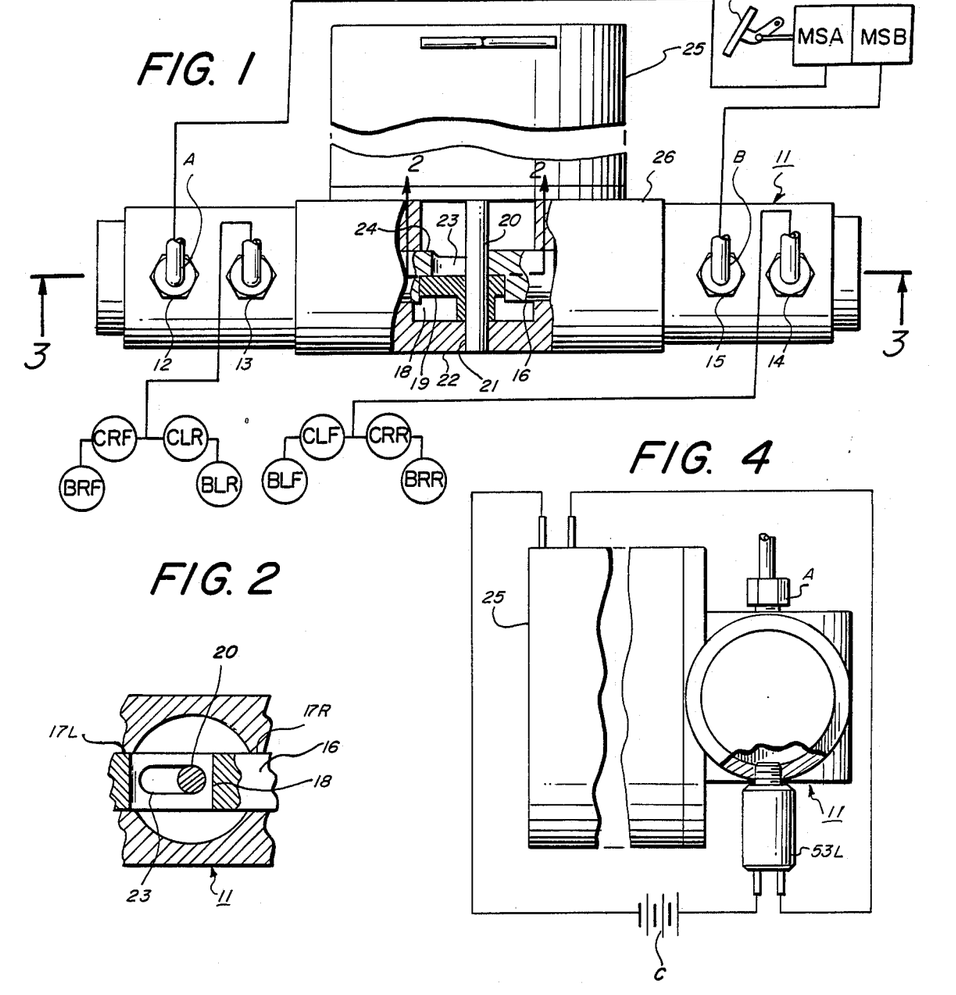
FIG. 1 is a partially sectional, partly schematic upper plan view of a cycling automatic wheel lockup control apparatus according to the present invention.
FIG. 2 is a fragmentary longitudinal sectional view of part of the rear half of the apparatus of FIG. 1, taken along line 2—2.
FIG. 4 is a left end elevation view of the apparatus of FIG. 3.
Figures 3, 5, 6:
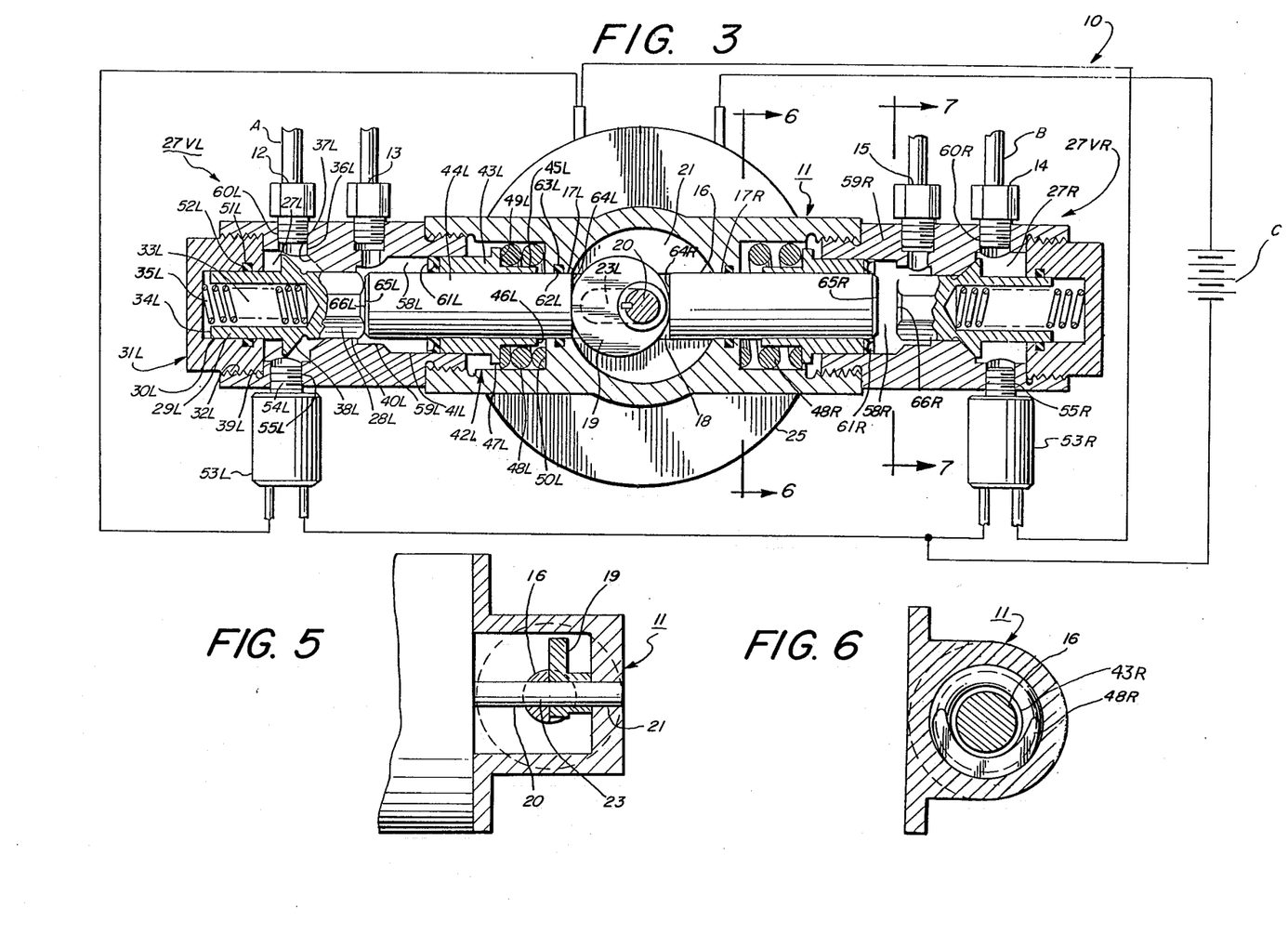
FIG. 3 is a front longitudinal sectional view of the apparatus of FIG. 1, taken along line 3—3.
FIG. 5 is a central transverse sectional view of the apparatus of FIG. 9, taken along line 5—5.
FIG. 6 is an intermediate transverse sectional view of the apparatus of FIG. 3, taken along line 6—6.

As shown in FIGS. 1 through 3, one embodiment of the automatic wheel lockup control apparatus 10 according to the present invention includes an elongated cylindrical body 11 which is generally symmetrically shaped, having two substantially identical sections on left and right sides of a transverse mid-plane through the body. The apparatus may be installed in any convenient place on a vehicle having a dual master brake cylinder pressuring two sets of brakes.

Typically, vehicles equipped with a dual master cylinder utilize a primary piston contained within one cylinder of the dual master cylinder to pressurize one pair of diagonally opposed front and rear brakes and a secondary piston contained within a second cylinder of the dual master cylinder to pressurize the other diagonal pair of brakes, when brake pedal P is depressed. Other vehicles use the primary master cylinder circuit to pressurize the front brake lines and a secondary cylinder circuit to pressurize the rear brake lines. In either type of vehicle, the apparatus 10 is inserted into the hydraulic circuit of the braking system such that the primary fluid pressure output line of the primary master cylinder MSA is connected by means of a pressure line A to a primary inlet fitting 12 of the apparatus. The pressure input line of the primary set of brakes, BRF and BLR, operated by wheel cylinders CRF and CLR which would normally connect to pressure line A, is connected to primary brake line outlet fitting 13 of the apparatus 10.

In an exactly similar fashion, the secondary fluid pressure output line of the secondary master cylinder MSB is connected by means of a pressure line B to a secondary inlet fitting 14 of the apparatus 10. The pressure input line of the secondary set of brakes, BLF and BRR, operated by wheel cylinders CLF and CRR which would normally connect to pressure line B, is connected to secondary brake line outlet fitting 15 of apparatus 10.

Referring now to FIGS. 1, 2 and 3, the apparatus 10 is seen to include an elongated cylindrical pushrod 16 coaxially positioned within the elongated cylindrical body 11 of the apparatus. Pushrod 16 is longitudinally slidable within symmetrical left and right coaxial bores 17L and 17R inside body 11. Pushrod 16 has a rectangular cross-section channel or notch 18 cut half way inwards from its front surface and extending symmetrically about the transverse mid-plane of the pushrod, from its top to bottom edge. Notch 18 receives a thin circular cam disc 19 having flat and parallel front and rear surfaces and having a diameter slightly less than the longitudinal width of the notch between its opposite vertical walls. Disc 19 is eccentrically fastened to, or integrally formed with, a shaft 20 journalled in a bore 21 centered coaxially on the front to rear center line of the body 11, and extending rearward through the front surface wall 22 of the body.

As may be seen best by referring to FIGS. 1 and 2, a longitudinally elongated slotted hole 23 extends inwards from the rear surface 24 of pushrod 16. Slotted hole 23 communicates with notch 18, and provides clearance for cam-disc shaft 20 for all angular positions of cam disc 19, as the cam-disc effects reciprocating motion of the pushrod 16 when the cam-disc shaft 20 is rotated. The cam-disc shaft 20 is coupled to the output shaft of a rotary electric motor 25 mounted transversely to body 11 on the rear cylindrical wall surface 26 of the body. Energizing motor 25 rotates cam-disc shaft 20 and cam-disc 19.

As stated previously, the apparatus 10 has a generally symmetrical appearance about a transverse mid-plane of body 11. In fact, the left and right halves of the apparatus can be identical. Accordingly, the ensuing description will describe the left hand components of the apparatus and designate those with an "L" suffix, while designating the corresponding right-hand components with an "R" suffix.

As shown in FIGS. 1 and 3, left fluid pressure inlet 12 communicates with a left annular-shaped inlet chamber 27L. Coaxially located within inlet chamber 27L is a valve element 28L of circular symmetry and longitudinally slidable within the valve chamber. Valve element 28L has a cylindrical outer end 29L slidable within a blind bore 30L in a cylindrical left end cap 31L screwed into a coaxial threaded bore 32L in the left end of body 11. The cylindrical outer end 29L of valve element 28L has a blind bore 33L extending longitudinally inwards from the outer circular face 34L of the valve element. Bore 33L receives a compression spring 35L which butts up one end of the spring against the bottom wall of the blind bore 30L in left end cap 31L, and the other end of the spring against the bottom wall of the blind bore in the valve element, thus urging valve element 28L into an inward, closed position.

The inner transverse wall surface 36L of inlet chamber 27L has a coaxial countersunk surface 37L forming a valve seat. Valve seat 37L is adapted to receive the complementarily shaped inner tapered annular surface 38L of an enlarged annular flange section 39L of valve element 28L, located longitudinally inwards of the outer left end 29L of the valve element sufficiently for it to reside entirely within annular inlet chamber 27L.

Countersunk surface 37L tapers linearly to a smaller diameter coaxial bore 40L in body 11. Bore 40L is of uniform circular transverse cross-section, and communicates at its inner open end with a larger diameter, coaxial piston bore 41L.

An inner opening of piston bore 41L in turn communicates with an even larger diameter piston spring bore 42L. The inner opening of piston spring bore 42L communicates with the outer end of bore 17L in which the inner portion of the left side of pushrod 16 is slidably supported.

Piston bore 41L slidably supports an elongated cylindrical piston 43L having a coaxial central bore 44L which slidably supports the left portion of pushrod 16. The outer longitudinal portion of piston 43L resides in piston bore 41L, while the inner longitudinal portion of the piston resides in piston spring bore 42L. The inner longitudinal portion of piston 43L has a necked down or reduced outer diameter section 45L extending longitudinally outwards from the inner annular transverse face wall 46L of the piston. Reduced diameter section 45L of piston 43L terminates at its outer longitudinal end in an annular shoulder flange 47L of larger diameter than both the reduced diameter section of the piston 45L and its larger diameter outer longitudinal section 43L.

A helical compression spring 48L of slightly smaller diameter than piston spring bore 42L is disposed coaxially around the reduced diameter inner end of piston 43L. The outer transverse surface of the outermost coil of spring 48L butts up against the inner transverse annular wall surface 49L of annular shoulder flange 47L of piston 43L. The inner transverse surface of the innermost coil of spring 48L butts up against the inner transverse annular wall 50L forming the inner transverse end of piston spring bore 42L.

Annular inlet chamber 27L is adapted to receive hydraulic fluid under pressure from fluid pressure input 12 Hydraulic fluid under pressure within inlet chamber 27L is prevented from leaking into blind bore 30L in left cylindrical end cap 31L by means of a ring-shaped resilient seal 51L held within an annular groove 52L in the inner cylindrical wall surface of the end cap bore, near the inner longitudinal end of the end cap. A pressure switch 53L having an externally threaded hollow nipple 54L is screwed into a threaded bore 55L provided in the bottom wall surface of body 11. The hollow interior bore nipple 54L communicates with annular inlet chamber 27L. When fluid pressure within chamber 27L exceeds a predetermined threshold, electrical contacts within the pressure switch 53L close, closing a circuit between the input and output terminals of the pressure switch. The reason for a predetermined threshold pressure will be clarified further on in this description.

Figure 7:
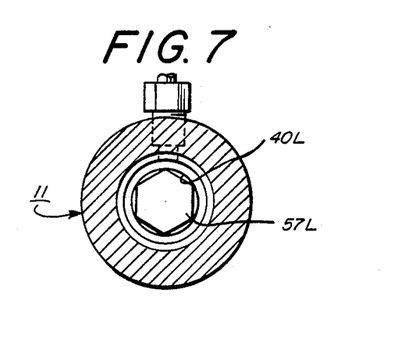
FIG. 7 is a third transverse sectional view of the apparatus of FIG. 3, taken along line 7—7.

As may be seen best by referring to the sectional view of FIG. 7, the longitudinal end portion 57L of valve element 28L located longitudinally inwards of annular flange section 39L of the valve element has a polygonal, preferably hexagonal, transverse cross-sectional shape.

Alternatively, bore 40L in body 11 may have a polygonal transverse crosssectional shape, in which case the end portion 57L of valve element 28L may be cylindrical. This portion 57L is longitudinally slidably disposed within body 11. Bore 40L communicates at its outer end with inlet chamber 27L, and at its inner end with piston bore 41L, and has a circular transverse crosssection. Therefore, when flange section 39L of valve element is positioned longitudinally outwards of valve seat 37L, fluid under pressure in inlet chamber 27L is able to enter piston bore 41L, travelling in the spaces between the outer hexagonal wall surface of the inner end of valve element 28L, and the circular inner wall surface of the bore 40L.

As shown in FIG. 3, the space between the inner cylindrical wall surface of piston bore 41L in body 11, and the outer surface of the outer longitudinal portion of pushrod 16 forms a piston chamber 58L which can vary in shape from the generally cylindrical shape of chamber 58R, with the pushrod retracted inwards, to a generally annular shape with the pushrod in its outermost position. The outer longitudinal end of piston chamber 58L has a reduced diameter bore 59L. Primary brake line outlet fitting 13 is threaded into a threaded bore 60L which extends radially inwards from the upper cylindrical wall of body 11 through the cylindrical wall surface of reduced diameter bore 59L, thereby providing fluid communication between piston chamber 58L and outlet fitting 13.

A resilient piston seal 61L having an annular shape and a concave outer annular surface fits over the outer longitudinal portion of pushrod 16 and butts up against the outer annular surface of piston 43L. Thus, when piston chamber 58L contains hydraulic fluid under pressure, piston seal 61L and piston 43L are urged inwards against the compressed reaction force of helical piston compression spring 48L.

Any lubricant from bore 21 in cylindrical body 11 is prevented from passing through the pushrod bore 17L by means of a ring-shaped resilient seal 62L held within an annular groove 63L in the inner cylindrical wall surface of the pushrod bore, near the inner opening of bore 21.

Apparatus 10 operates as follows. Referring now to FIGS. 1 and 3, it may be seen that pressure switches 53L and 53R each have one terminal connected to a terminal of a vehicle battery C, and one terminal connected to a single terminal of rotary electric motor 25. The other terminal of the rotary electric motor 25 is connected to the other battery terminal. Thus, if hydraulic pressure in either left annular outlet chamber 27L or right annular inlet chamber 27R exceeds a predetermined threshold, motor 25 will be powered by battery C, rotating cam-disc shaft 20 clockwise as viewed from the front, FIG. 3 and FIG. 8.

Figure 8:
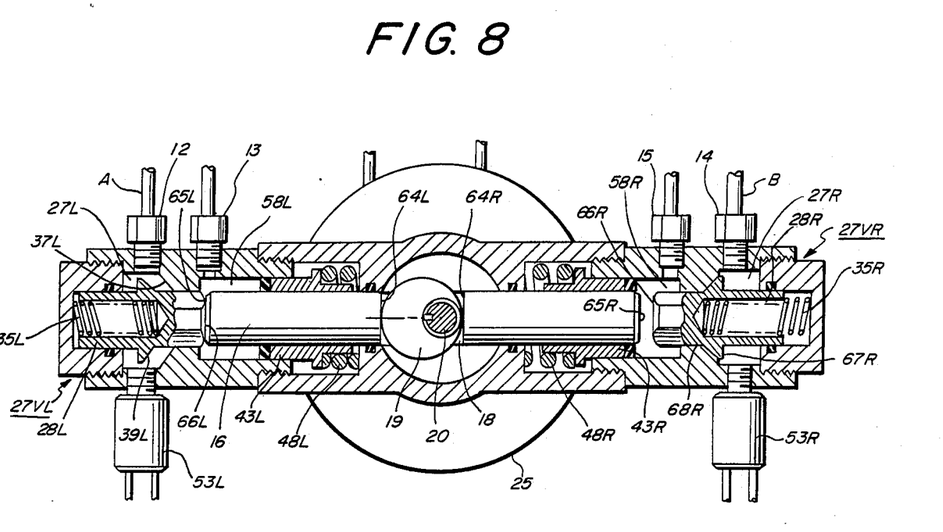
FIG. 8 is a front elevation view, partially in longitudinal section, showing the apparatus of FIG. 3 on a somewhat reduced scale and showing the high end of an eccentric cam forming part of the apparatus in its leftmost position.

Referring now to FIG. 8, cam-disc shaft 20 and camdisc 19 are shown in their left-most positions. In this position of cam-disc 19, the circumferential surface of the cam-disc 19 is at the greatest radial distance from the center of the cam-disc shaft 20 on which the camdisc is eccentrically mounted, i.e., the "cam lobe high spot," bears against the left vertical wall surface 64L of vertical channel 18 of pushrod 16 to push the pushrod to its left-most, or longitudinally outward extreme. Thus positioned, the outer transverse end wall 65L of pushrod 16 abuts the inner transverse end wall 66L of valve element 28L, forcing the valve element to its longitudinally outermost position against the reaction force of valve spring 35L. In this position, left valve 27VL is fully open, flange section 39L of valve element 28L being fully unseated from valve seat 37L.

Now, if the vehicle brake pedal P is depressed, the primary master cylinder pressure line A will pressurize inlet chamber 27L, causing hydraulic fluid under pressure to pass through valve seat 37L of valve 27VL into piston chamber 58L. As stated previously, piston chamber 58L communicates with primary brake line outlet fitting 13. Therefore, full primary master cylinder piston hydraulic pressure will at this time be applied to the slave wheel cylinders CRF, CLR of the primary braking wheels, which may be the the front brakes, or a diagonally opposed front and rear pair of wheels. The hydraulic fluid pressure within piston chamber 58L also forces piston 43L inwards at this time, compressing spring 48L. The spring constant of piston compression spring 48L is so selected as to allow full compression of the spring when the applied braking hydraulic pressure is sufficiently great to lock the wheels on a dry road.

When the vehicle brakes are applied with sufficient force for the pressure in the primary pressure line to reach a predetermined threshold, pressure switch 53L is actuated, causing motor 25 to rotate cam-disc 19 in a clockwise direction. Clockwise rotation of cam-disc 19 moves pushrod 16 to the right. Valve element 28L follows pushrod 16 due to the restoring force of compressed valve spring 35L. At the same time, the movement of the right end of pushrod 16 into right piston chamber 58R displaces fluid from the space between the outer transverse wall 65R of the pushrod 16 and the inner transverse end wall 66R of valve element 28R. This displacement of fluid acts against piston 43R, compressing spring 48R, thus causing a moderated rate of increase in pressure applied to the secondary brake line through fitting 15.

Figure 9:
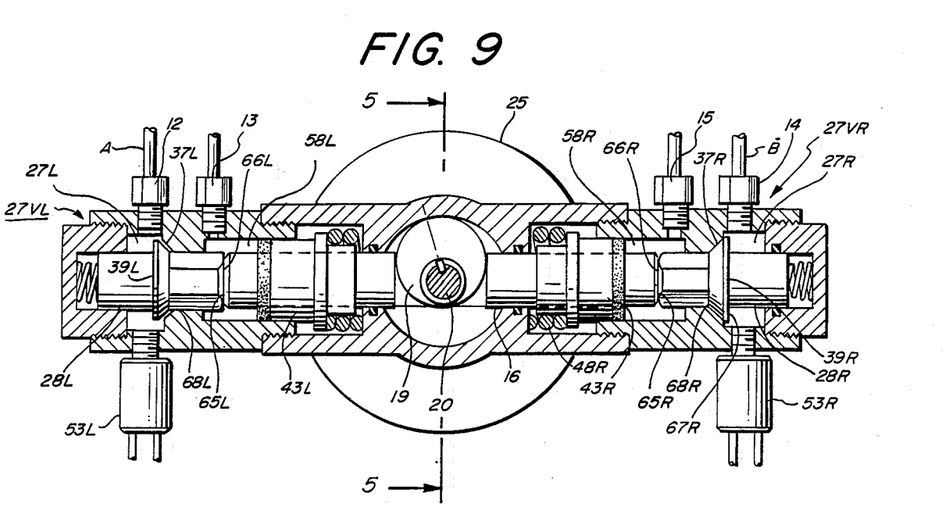
FIG. 9 is a view similar to that of FIG. 8, but showing the cam rotated approximately 82 degrees clockwise.

Referring to FIG. 9, the length of valve elements 28L and 28R are such that after approximately 82 degrees of clockwise rotation of cam-disc 19, the right end 65R of pushrod 16 just contacts the inner end 66R of valve element 28R. This displaces the maximum amount of fluid from piston chamber 58R, forcing piston 43R inwards until spring 48R is compressed solid and applying the maximum pressure to the secondary brake line through outlet fitting 15.

Fluid pressure from master cylinder secondary pressure line B pressurizes right annular inlet chamber 27R, exerting a longitudinally inward directed, closing force on the outer annular surface 67R of annular flange 39R of valve element 28R. Fluid pressure increase produced in piston chamber 58R by the compression of spring 48R due to the reduction of the volume of the space between the end of pushrod 16 and the inner end 66R of valve element 28R exerts a longitudinally outward directed, opening force on the much smaller inner annular surface 68R of annular flange 39R of valve element 28R. The ratio between inner and outer flange areas, and amount of pressure build-up in piston chamber 58R caused by compression of spring 48R, are so chosen that the pressure build-up in the piston chamber is never sufficient to unseat valve element 28R against the closing pressure applied by the master cylinder's secondary piston against annular flange section 39R.

In the pushrod position shown in FIG. 9, pushrod 16 is still holding flange 39L of valve element 28L of valve 27VL slightly open. The length of the pushrod 16, valve elements 28L and 28R, and longitudinal distance between valve seats 37L and 37R are so chosen that flange 39L of valve element 28L and flange 39R of valve element 28R will never be seated at the same time. This ensures that one or the other pressure outlet lines from the master cylinder will always be coupled to one set of wheel brakes.

Figure 10:
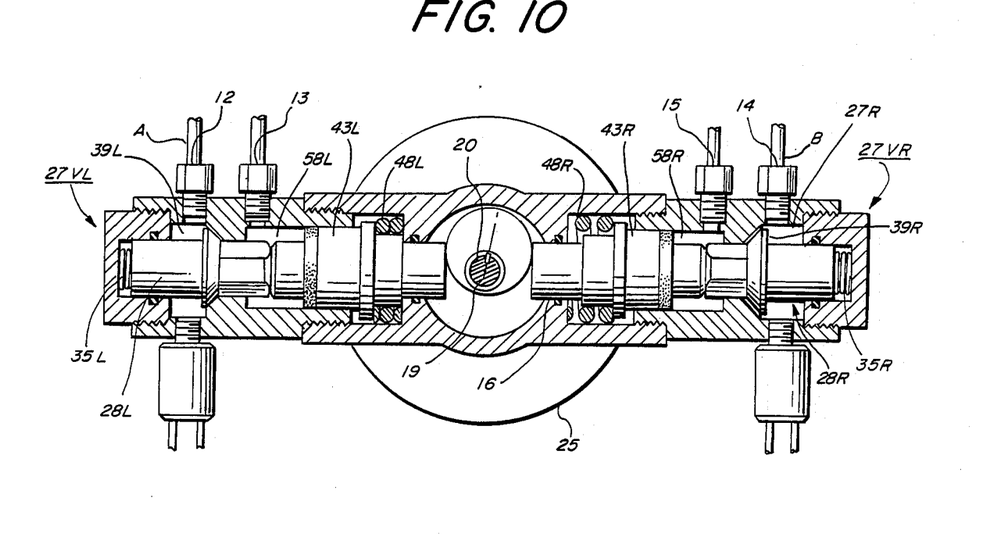
FIG. 10 is a view similar to that of FIG. 8, but showing the cam rotated clockwise an additional increment of approximately 16 degrees.

FIG. 10 illustrates the configuration of apparatus 10 when cam-disc 19 has rotated approximately 16 degrees clockwise from its position in FIG. 9, or a total of approximately 98 degrees from its left most position of FIG. 8. At this position of cam-disk 19, the right end of pushrod 16 is moved to the right by the cam-disc sufficiently far to unseat flange 39R of right valve element 28R, while the left end of the pushrod has moved inwards sufficiently to permit valve spring 35L to fully seat flange 39L of left valve element 28L. The opening of right valve 27VR allows hydraulic fluid under pressure from the master cylinder's secondary piston in right annular chamber 27R to pass through flange 39R of open valve 27VR into right piston chamber 58R, thus pressurizing the alternate set of brakes BLF, BRR through secondary brake line outlet fitting 15 and holding piston 43R inwards against compressed spring 48R. When the applied braking pressure is sufficient to lock the wheels on a dry road, piston 43R is pushed inwards sufficiently far to fully compress piston spring 48R. At this pressure level, full secondary master cylinder piston hydraulic pressure is applied to the alternate wheel brakes.

With flange 39L of left valve element 28L seated, fluid pressure produced in left annular inlet chamber 27L by the master cylinder's primary piston is removed from piston chamber 58L. However, piston chamber 58L remains pressurized by the reaction force of piston spring 48L urging piston 43L outwards, providing brake pressure in the chamber and primary brake line outlet fitting 13. As previously stated, the fully compressed spring pressure should be sufficient to lock the wheels on a dry road.

Continued movement of pushrod 16 to the right opens a gap between the outer transverse end wall 65L of the pushrod and the inner transverse end wall 66L of valve element 28L, thus increasing the fluid volume capacity of left piston chamber 48L. This volume increase is offset by the spring 48L urging the piston 43L outward, thus causing a moderation in the rate of release of pressure to the brakes through primary brake line outlet fitting 13.

Figure 11:
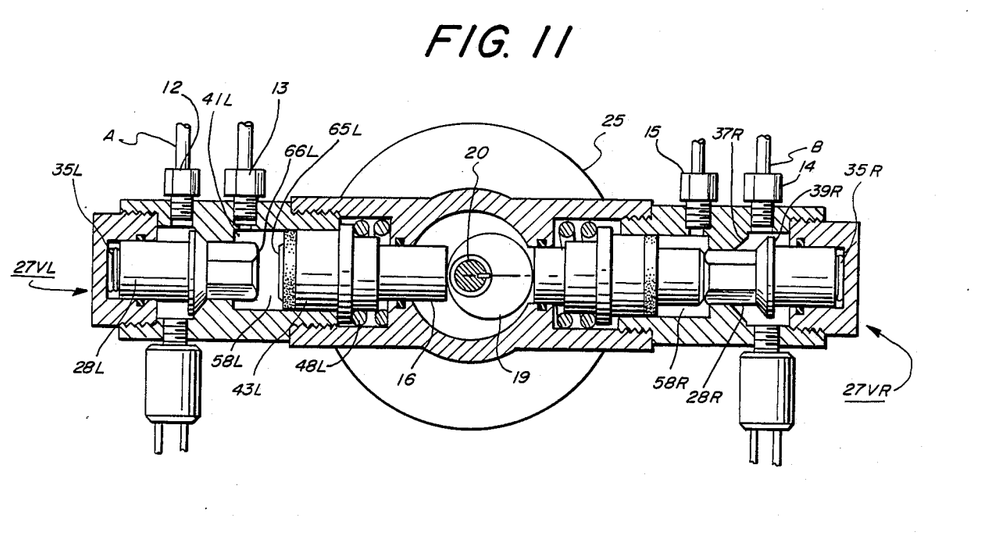
FIG. 11 is a view similar to that of FIG. 8, but showing the cam rotated 180 degrees from its position in FIG. 8.
Figure 12:
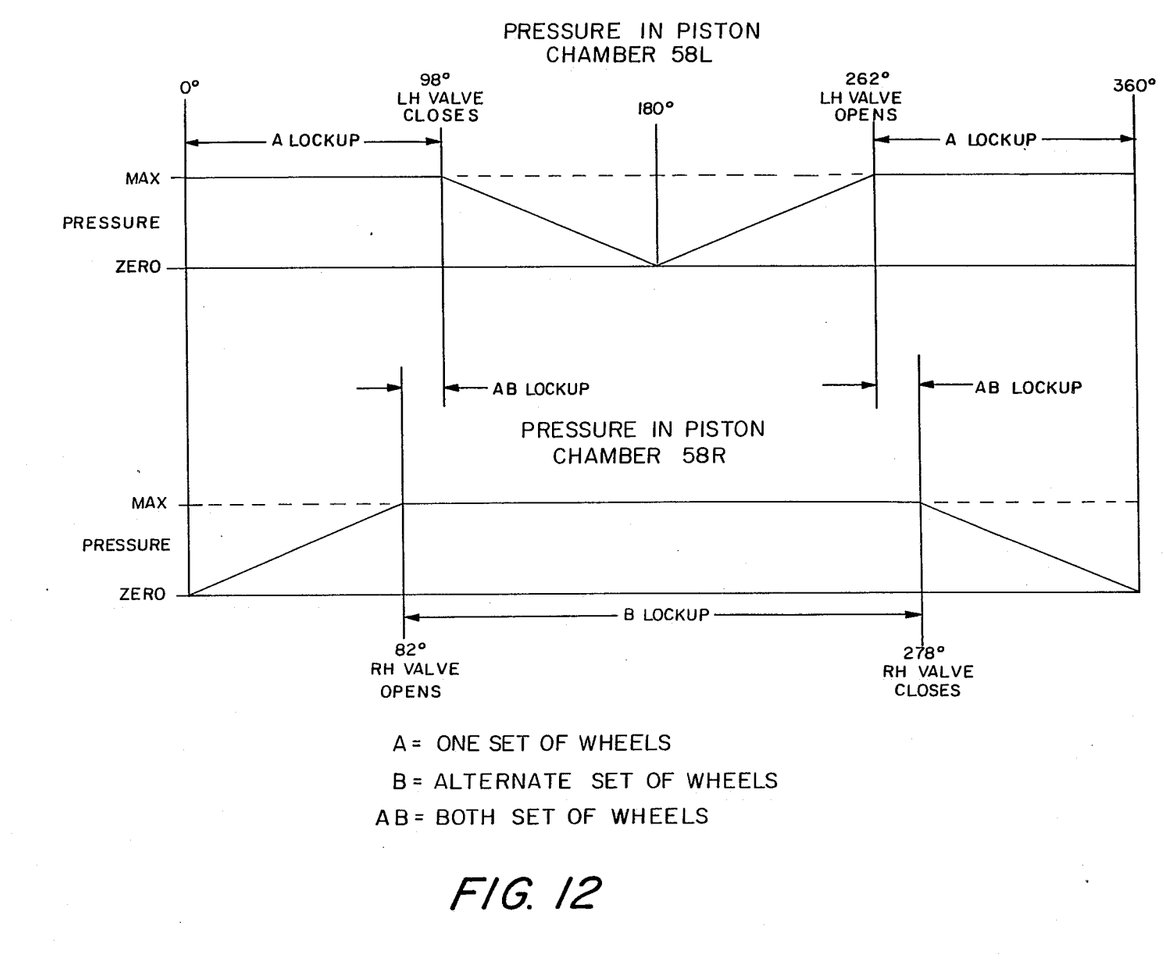
FIG. 12 is a timing diagram showing the time relationship of the opening and closing durations of left and right valves of the apparatus of FIG. 1.

FIG. 11 illustrates the configuration of apparatus 10 when cam-disc 19 has rotated 180 degrees clockwise from its left-most position of FIG. 8. At this position of cam-disc 19, the right end of pushrod 16 has moved to the right hand outer limit of its travel, pushing valve element 28R of valve 27VR to its maximum distance from valve seat 37R and fully unseating flange 39R of valve element 28R. At the same time, the gap between the left end of pushrod 16 and the inner end of valve element 28L is at its maximum. The corresponding volume increase in piston chamber 58L is sufficient to reduce the pressure in the chamber enough to allow piston spring 48L to expand to its maximum undeflected length, removing all pressure in the chamber and in the primary brake lines coupled to the chamber. The maximum volume of fluid displaced by the outward movement of the piston 43L must equal the volume of fluid increase caused by the retraction of pushrod 16.

Further rotation of cam-disc 19 will cause right valve element 28R to move inward in a direction initiating closing of flange 39R of right valve element 28R, and left valve element 28L to move outward in a direction initiating opening of flange 39L of left valve element 28L. Sequential pressurization and relaxation of the secondary brakes coupled to secondary brake line outlet fitting 15 then follows the same pattern as described above for the primary brakes. When cam-disc 19 reaches its left-most position, as shown in FIG. 8, one cycle of pressurization and relaxation of alternate sets of wheel brakes is completed. This cyclical actuation of alternate sets of brakes will continue as long as the hydraulic fluid pressure within either left annular inlet chamber 27L or right annular inlet chamber 27R exceeds the predetermined actuation pressure threshold of pressure switch 53L or 53R, respectively. The threshold pressure can be established by the master cylinder pistons, the piston springs 43L and 43R, or the wheel brake retracting springs acting on the slave wheel brake cylinders.

When pressure from a master cylinder is removed from an inlet chamber 27L or 27R, movement of a pushrod end into piston chamber 58L or 58R which increases pressure in the piston chamber will unseat the flange 39L or 39R of valve element 28L or 28R against the pressure of valve spring 35L or 35R, allowing fluid to return to the respective primary or secondary chamber of the master cylinder. Pressure from the brake retracting springs will also force the valve flanges 39L and 39R to open.

During conditions of reduced wheel traction caused by wet, snowy or icy roads, the vehicle wheels will lock up under much less brake pedal pressure. This reduced pressure will cause less deflection of piston springs 48L and 48R. But the volume increase of piston chambers 58L and 58R caused by the movement of the pushrod 16 inwards in a piston chamber to create a gap between the pushrod end and valve element 28L or 28R remains the same. Therefore, with less maximum deflection, springs 48L and 48R will return to their free lengths more quickly, releasing all pressure on the brakes and allowing the wheels to begin rotating sooner.

Springs 48L and 48R are high rate, low deflection springs. Their completely compressed, or solid length reaction force is chosen to result in a reaction pressure exertable by piston 43L or 43R which is equal to the hydraulic braking pressure required to lockup the wheels on dry roads. Belleville spring washers could be used in place of the coiled wire type shown.

Most brake systems have proportioning valves between the front and rear hydraulic lines of each set of brakes. The proportioning valves allow greater braking pressure to be applied to the front wheels, because the forward momentum of the vehicle exerts a greater load on the front wheels during braking. The proportioning valves are located in a separate manifold, away from the master cylinder. On these systems, brake line outlet fittings 13 and 15 will be connected to the alternate input ports of the proportioning valve manifold.

Some brake systems utilize proportioning valves integral with the master cylinder. On these systems the hydraulic fluid lines from the proportioning valve must be blocked off and the fluid lines for the rear brakes routed to pressure inlet lines 12 and 14 on apparatus 10. A separate proportioning valve manifold is then installed in series with outlet lines 13 and 15 and the wheel brakes.

Positioning the valve elements 28L and 28R relative to cam-disc 19 and pushrod 16 so that flanges 39L and 39R of valves 27VL and 27VR may never be closed at the same time insures that at least one set of brakes will always be activated, even if motor 25 fails at any angular position of cam-disc shaft 20. This feature permits the use of a threshold pressure for the pressure switches 53L and 53R which is higher than the pressure required to hold the vehicle stopped, at a traffic signal for example, or at a predetermined low speed. The lower brake pedal pressure will then apply only one set of brakes, but that will be sufficient for the conditions noted.

Pistons 43L and 43R working against the restoring force of springs 48L and 48R are required to moderate the rate of release of any application of pressure to the brakes. Without the cooperative action of pistons and springs, brake pressure would be instantly removed or applied when valves 27VL and 27VR open or close, causing a pulsation in the braking action.

The novel mechanism for moderating the rate of pressure increase and decrease disclosed above has applications in anti-lock braking systems of other kinds, since it provides a very effective means for limiting an undesirable pulsation in the brake pedal response.

What is claimed is:

1. An apparatus for cyclically applying hydraulic pressure to two separate sets of vehicle wheel brakes supplied by primary and secondary master cylinder pistons, respectively, said pressure being applied substantially alternatively but with some overlap to said separate sets of brakes, said apparatus comprising;
   a. means for sensing the hydraulic pressure produced by said primary and secondary master cylinder pistons,
   b. first valve means interposed between said primary master cylinder pressure line and said primary brake line,
   c. second valve means interposed between said secondary master cylinder pressure line and said secondary brake line,
   d. valve actuating means responsive to said pressure sensing means in alternatively and cyclically fully opening and fully closing said first and second valve means when said pressure provided by one of said primary and secondary master cylinder pistons exceeds a predetermined threshold, said valve actuating means opening each of said first and second valve means for a period T1 slightly greater than 180 degrees out of a 360-degree cycle, thereby causing each of said first and second valve means to be exclusively open for a period T2 slightly less than 180 degrees, equal to the difference between 360 degrees and T1, whereby either said primary or secondary brakes may be locked up for a period T2, and causing both of said first and second valve means to be open for an overlap period T3 equal to the difference between T1 and T2, whereby both primary and secondary brakes may be locked up for said period T3.

2. The apparatus of claim 1 further including means for moderating the rate of increase and decrease of pressure in each of said separate brake lines connected to said apparatus.

3. The apparatus of claim 2 wherein said means for moderating said rate of pressure increase and decrease comprises a separate pressure accumulator chamber coupled to each of said primary and secondary brake lines, said pressure accumulator having an resilient member which is compressed as pressure builds up in said accumulator, thereby moderating the rate of rise of pressure applied to said brake line coupled to said accumulator and resiliently expands as pressure subsides in said accumulator, thereby moderating the rate of pressure decrease to said brake line.

4. The apparatus of claim 1 wherein said predetermined pressure threshold is slightly greater than that master cylinder pressure required to hold the vehicle in a stopped position, whereby said valve actuating means is not actuated with said vehicle brakes in said stopped condition.

5. The apparatus of claim 1 wherein said period T1 is defined as being approximately 196 degrees.

6. An automatic wheel lockup control apparatus comprising:
   a. a housing,
   b. a first, primary valve located within said housing, said primary valve having an inlet fitting adapted to be connected in a fluid-tight connection to a primary master brake cylinder line, and an outlet fitting adapted to be connected in a fluid-tight connection to a primary set of wheel brake slave cylinders,
   c. a second, secondary valve located within said housing, said second valve having an inlet fitting adapted to be connected in a fluid-tight connection to a secondary master brake cylinder line, and an outlet fitting adapted to be connected in a fluid-tight connection to a secondary set of wheel brake slave cylinders,
   d. pressure sensing means capable of producing a command signal when the pressure in either of said primary or secondary inlet fittings exceeds a predetermined threshold pressure, and
   e. valve actuating means within said housing responsive to said command signal from said pressure sensing means in alternatively and cyclically opening an closing said primary and secondary valves with an overlapping open period T3 equal to a small fraction of a 360-degree cycle, thereby alternately and cyclically applying full primary master cylinder pressure to said primary brakes and full secondary master cylinder pressure to said secondary brakes, and to both primary and secondary brakes during said overlap period.

7. The apparatus of claim 6 further including a first, primary pressure accumulator coupled in a fluid-tight connection to said primary brake line outlet fitting, said primary pressure accumulator having a resilient element compressible in response to a pressure increase in said outlet fitting, and extendible in response to a pressure decrease in said outlet fitting, said compression and extension thereby moderating the rate of pressure increase and decrease, respectively, in said primary brake line outlet fitting.

8. The apparatus of claim 7 further including a second, secondary pressure accumulator coupled in a fluid-tight connection to said secondary brake line outlet fitting, said secondary pressure accumulator having a resilient element compressible in response to a pressure increase in said outlet fitting, and extendible in response to a pressure decrease in said outlet fitting, said compression and extension thereby moderating the rate of pressure increase and decrease, respectively, in said secondary brake line outlet fitting.

9. A cycling automatic wheel lock-up control apparatus for interposition between the master cylinder and slave wheel cylinders of a vehicle braking system comprising:

a. an elongated, generally cylindrically-shaped hollow body, said body being generally symmetrical about a transverse mid-plane of said body, b. a first, primary valve located within a first end portion of said body, said primary valve having an inlet chamber adapted to couple in fluid-tight connection to a primary outlet pressure line from said master cylinder, an outlet chamber adapted to couple in fluid-tight connection to a primary set of brake lines, and a valve element longitudinally slidable within said body and cooperatively interactive with said inlet and outlet chambers so as to block fluid communication between said inlet and outlet chambers at one longitudinal position of said valve element relative to said body, and to permit fluid communication between said inlet and outlet chambers at another longitudinal position of said valve element.

c. A second, secondary valve located within a second end portion of said body, said secondary valve having an inlet chamber adapted to couple in fluid-tight connection to a secondary outlet pressure line from said master cylinder, an outlet chamber adapted to couple in fluid-tight connection to a secondary set of brake lines, and a valve element longitudinally slidable within said body and cooperatively interactive with said inlet and outlet chambers so as to block fluid communication between said inlet and outlet chambers at one longitudinal position of said valve element relative to said body, and to permit fluid communication between said inlet and outlet chambers at another longitudinal position of said valve element, d. an elongated pushrod longitudinally slidable within said body, said pushrod having a first transverse end face adapted to abut and actuate said valve element of said primary valve, and a second, opposite transverse face adapted to abut and actuate said valve element of said secondary valve, said pushrod and said valve elements being so positioned as to cause said primary valve and said secondary valve to be opened for a period T1 slightly greater than half of pushrod actuating cycle, and said primary and second valves to be simultaneously open for a period T3 equal to a small fraction of pushrod actuator cycle, e. actuating means for reciprocally moving said pushrod in response to command signal, and f. pressure sensing means responsive to pressure in either of said primary or secondary master cylinder outlet pressure lines exceeding a predetermined threshold level in producing said command signal for said actuating means.

10. The apparatus of claim 9 further including means for biasing said primary and secondary valve means into a particular longitudinal position.

11. The apparatus of claim 10 further including a first, primary pressure accumulator coupled in a fluid-tight connection to said primary outlet chamber, said primary pressure accumulator having a resilient element compressible in response to a pressure increase in said outlet fitting, and extendible in response to a pressure decrease in said outlet fitting.

12. The apparatus of claim 11 wherein said primary pressure accumulator is further defined as comprising:
a. a generally cylindrically-shaped piston having a coaxial central bore disposed through the entire length of said piston, said bore slidably engaged by the outer cylindrical surface of said pushrod, said piston having an outer annular face longitudinally movable in fluid-tight communication with said outlet chamber, and
b. a compression spring longitudinally compressible in response to longitudinal inward movement of said piston relative to said body.

13. The apparatus of claim 12 further including a secondary pressure accumulator substantially identical in structure and function to said primary pressure accumulator, said secondary pressure accumulator being coupled in fluid-tight connection to said secondary outlet chamber.

14. The apparatus of claim 13 wherein said pressure sensing means comprises an electrical pressure sensing switch coupled to at least one inlet chamber.

15. The apparatus of claim 14 wherein said actuating means for reciprocally moving said pushrod comprises:
a. an eccentrically rotatable member operatively interactive with said pushrod to cause one cycle of reciprocation of said pushrod for each complete rotation of said eccentrically rotatable member, and
b. a rotary motor for rotating said eccentrically rotatable member.

16. The apparatus of claim 15 wherein said pushrod is further defined as having extending inwards from a front face of said pushrod a rectangular notch having vertically disposed, parallel opposite side walls adapted to contact opposite sides of said eccentrically rotating member.

17. The apparatus of claim 16 wherein said rotary motor is further defined as being an electrically powered motor.

18. The apparatus of claim 17 wherein said motor is connected in series with said pressure switch and a source of electrical power.

* * * * *